United States Patent
Giesselmann et al.

(10) Patent No.: US 12,545,853 B2
(45) Date of Patent: Feb. 10, 2026

(54) METHOD FOR PRODUCING OIL FROM A MICROALGAE PRODUCT

(71) Applicant: K.D. PHARMA BEXBACH GMBH, Bexbach (DE)

(72) Inventors: Gideon Giesselmann, Tawern (DE); Roberto Fronzoni, Homburg (DE); Denitsa Shopova-Gospodinova, Schönenberg-Kübelberg (DE); Elia Ramos-Tercero, Saarbrücken (DE)

(73) Assignee: K.D. PHARMA BEXBACH GMBH, Bexbach (DE)

( * ) Notice: Subject to any disclaimer, the term of this patent is extended or adjusted under 35 U.S.C. 154(b) by 265 days.

(21) Appl. No.: 18/022,847

(22) PCT Filed: Aug. 26, 2021

(86) PCT No.: PCT/EP2021/073641
§ 371 (c)(1),
(2) Date: Feb. 23, 2023

(87) PCT Pub. No.: WO2022/043453
PCT Pub. Date: Mar. 3, 2022

(65) Prior Publication Data
US 2023/0357665 A1 Nov. 9, 2023

(30) Foreign Application Priority Data
Aug. 26, 2020 (LU) .................... LU102019

(51) Int. Cl.
| | | |
|---|---|---|
| *C11C 1/00* | (2006.01) | |
| *A23D 9/04* | (2006.01) | |
| *C11C 1/10* | (2006.01) | |
| *C11C 3/04* | (2006.01) | |
| *C11C 3/10* | (2006.01) | |

(52) U.S. Cl.
CPC .............. *C11C 1/005* (2013.01); *A23D 9/04* (2013.01); *C11C 1/10* (2013.01); *C11C 3/04* (2013.01); *C11C 3/10* (2013.01)

(58) Field of Classification Search
CPC ... C11C 1/005; C11C 1/10; C11C 1/08; C11C 3/10; C07C 67/02; B01D 11/04; B01D 17/02
See application file for complete search history.

(56) References Cited

U.S. PATENT DOCUMENTS

| 5,288,619 | A | * | 2/1994 | Brown | ............... C11C 3/12 |
|---|---|---|---|---|---|
| | | | | | 426/607 |
| 2006/0080891 | A1 | | 4/2006 | Ghosh | |
| 2014/0128465 | A1 | | 5/2014 | Raman | |
| 2014/0288014 | A1 | * | 9/2014 | Vick | ............ A61K 31/202 |
| | | | | | 514/25 |
| 2015/0159116 | A1 | * | 6/2015 | Patinier | ............. C11B 1/025 |
| | | | | | 554/205 |
| 2016/0024425 | A1 | | 1/2016 | Shinde | |
| 2019/0071618 | A1 | | 3/2019 | Kralove | |
| 2020/0231996 | A1 | * | 7/2020 | Yu | ................... C11B 1/04 |

FOREIGN PATENT DOCUMENTS

| JP | S59113099 A | 6/1984 | |
|---|---|---|---|
| WO | WO-2019201478 A1 * | 10/2019 | ........... A23D 9/02 |

OTHER PUBLICATIONS

International Search Report Dated Dec. 3, 2021, PCT/EP2021/073641, 3 Pages.

* cited by examiner

*Primary Examiner* — Yate' K Cutliff
(74) *Attorney, Agent, or Firm* — LUCAS & MERCANTI, LLP; Klaus P. Stoffel

(57) ABSTRACT

A method for producing edible oil, having a high content of unsaturated fatty acids, from a product of microalgae. The microalgae product is treated to form an intermediate product that is subjected to a material separation process for removing impurities, in which material separation process the triglyceride is used as a carrier for the impurities. A microalgae oil and/or a lipid extract is advantageously used as the microalgae product. The microalgae product is preferably obtained from microalgae, more particularly photoautotrophic and/or mixotrophic microalgae. The microalgae product is treated by transesterification in order to form the intermediate product, wherein the microalgae product is preferably transformed into an ethyl ester. An organic phase is separated from an inorganic phase of the intermediate product and the organic phase of the intermediate product is subjected to a material separation process for removing impurities, in which material separation process the triglyceride is used.

14 Claims, No Drawings

METHOD FOR PRODUCING OIL FROM A MICROALGAE PRODUCT

CROSS-REFERENCE TO RELATED APPLICATIONS

The present application is a 371 of International application PCT/EP2021/073641, filed Aug. 26, 2021, which claims priority of LU LU102019, filed Aug. 26, 2020, the priority of these applications is hereby claimed and these applications are incorporated herein by reference.

BACKGROUND OF THE INVENTION

The invention relates to a method for producing oil, especially edible oil, having a high content of unsaturated fatty acids, from a product of microalgae.

Algae oil, which can be produced from phototrophic and/or mixotrophic microalgae, is currently not usable as an edible oil since it forms a black paste comprising chlorophyll, pigments and other fat-soluble substances. The flowability and composition of the oil depends on the microalgae species, the cultivation conditions and the harvesting process. To date, the microalgae biomass has been pre-treated by freeze-drying or spray-drying and then extracted by solvent extraction or extraction with supercritical liquid. However, there is interest in producing consumable oil from microalgae, as they have comparatively high contents of omega-3 fatty acid, especially eicosapentaenoic acid (EPA).

SUMMARY AND DETAILED DESCRIPTION OF THE INVENTION

The object of the invention is to create a method that allows the production of edible oil from microalgae oil.

This object is achieved in accordance with the invention in that the microalgae product is treated, forming an intermediate product, and is subjected to a material separation process for removing impurities, in which triglyceride is used as carrier for the impurities.

Surprisingly, it has been shown that by means of a material separation process using triglyceride, it is possible to create such a pure oil having a high content of omega-3 fatty acids from the microalgae product with comparatively little effort that it is suitable for use as an edible oil.

Advantageously, more than 80% of the impurities can be removed from the microalgae product by means of the method. Depending on the method regime, more than 90%, possibly more than 95%, of the impurities can be removed.

It is expedient to use a microalgae oil and/or a lipid extract as the microalgae product. Preferably, the microalgae oil or lipid extract is obtained from phototrophic and/or mixotrophic microalgae.

Lipid extracts from green algae or from unicellular photosynthetic organisms have proven to be particularly suitable for carrying out the method.

Preferably, the microalgae product has a content of at least 15% by weight EPA, preferably at least 20% by weight EPA, particularly preferably at least 30% by weight.

In one embodiment, the microalgae product has a pigment content, especially chlorophyll content, which is greater than 15 000 mg/100 g, optionally greater than 20 000 mg/100 g.

In one embodiment of the invention, the microalgae product is treated by means of transesterification to form the intermediate product. Usefully, it is converted to an ethyl ester. This method step serves to prepare the increase in the concentration of omega-3 fatty acids, in particular EPA and/or DHA (docosahexaenoic acid), in the intermediate product. Advantageously, the microalgae product is chemically and/or enzymatically neutralized and/or phospholipids are removed therefrom.

In a further embodiment of the invention, the microalgae product is added to a solvent for the transesterification. The microalgae product may be completely or at least partially soluble in water and/or in organic solvent, particularly in polar or non-polar liquids. For example, it is soluble in ethanol or hexane and partially soluble in water.

It has been found advantageous to use a catalyst to carry out the transesterification. In particular anhydrous acids such as sulfuric acid have been found to be suitable. The transesterification reaction is preferably carried out at temperatures<100° C., particularly preferably <80° C. and for a duration>30 min, preferably >60 min, particularly preferably >300 min.

In one configuration of the invention, the intermediate product, particularly after transesterification, is subjected to the material separation process for removing impurities. Expediently, the triglyceride is added to the intermediate product for the material separation process, preferably after the transesterification.

In one configuration of the invention, an organic phase is separated from an inorganic phase of the intermediate product, preferably by mechanical separation, particularly preferably sedimentation and/or centrifugation. For this purpose, a solvent, in particular an organic solvent, is expediently added to the intermediate product. Mechanical separation can be carried out, for example, by sedimentation, precipitation or centrifugation.

The inorganic phase separated off in this case can be subjected again, if necessary several times, to the transesterification described above in order to additionally separate off any organic phases remaining therein.

The organic phase is likewise separated off. The residue forms the intermediate product in the form of an ethyl ester.

In a particularly preferred configuration of the invention, the organic phase of the intermediate product is subjected to a thermal material separation process for removing impurities. Such impurities may be formed by pigments, in particular by chlorophylls, phycoerythrins and/or carotenoids, for example carotenes and xanthophylls.

The triglyceride, preferably a triglyceride oil, is usefully employed in the thermal material separation process.

Surprisingly, it has been shown that triglyceride is particularly well suited as a carrier for removing impurities, especially pigments that darken the oil.

The thermal material separation process to remove impurities is preferably carried out by means of distillation, preferably molecular distillation. It has proven to be particularly advantageous to carry out the molecular distillation at a pressure of 0.001 to 1 mbar. This enables a particularly mild treatment of the intermediate product, since the boiling temperature of the individual components thereof is reduced and the distillation can be carried out at a comparatively low temperature.

Suitably, the intermediate product is mixed with the triglyceride, in particular triglyceride oil, in a mass ratio of between 1:0.1 to 1:15, preferably in a mass ratio of 1:0.5 to 1:7, particularly preferably in a mass ratio of 1:1 to 1:5.

The molecular distillation is advantageously carried out in a temperature range between 100° C. and 190° C., preferably between 130° C. and 175° C. During the distillation, in particular the molecular distillation, the lipids preferably remain in the ethyl ester which forms the distillate, and the triglycerides comprising the impurities are separated out.

The omega-3 fatty acid concentration in the intermediate product thus obtained is expediently increased by means of an additional process for increasing the concentration of omega-3 fatty acid. The concentration-increasing process may be a distillation, in particular molecular distillation, an extraction using silver salt, liquid chromatography, in particular supercritical fluid chromatography (SFC), and/or a precipitation, especially using urea.

In a preferred embodiment of the invention, saturated fatty acids are separated from the intermediate product, in particular after the thermal material separation process, preferably by adding urea, especially urea crystals.

After the saturated fatty acids have been separated, the intermediate product is advantageously subjected to purification by a thermal material separation process to remove remaining impurities, especially urea, from the concentration-increasing process. The intermediate product can then be converted to a triglyceride by transesterification.

In a further configuration of the invention, an antioxidant is added to the intermediate product after separation of the saturated fatty acid or after said transesterification to the triglyceride. The antioxidant is used to bleach the intermediate product. Preferably, a naturally occurring antioxidant is used. Clay, which has already been used in various food production processes, has proven to be suitable for this purpose. With the method according to the invention, an oil can be produced which has an EPA content of more than 50% by weight, preferably more than 60% by weight, particularly preferably more than 70% by weight.

It has proven to be particularly advantageous to produce the oil in such a way that it has a pigment content, especially chlorophyll content, of <4000 mg/100 g, preferably <3000 mg/100 g.

The invention is described in more detail below by way of a working example.

1$^{st}$ Example

For the method described below for producing an edible oil having a high content of omega-3 fatty acid, an oil paste obtained from microalgae of the genus *Nannochloropsis* was used as the microalgae product. The oil paste was analyzed by means of High Performance Liquid Chromatography (HPLC) and gas chromatography. The following contents were determined:

Triglycerides: 29.2% by weight
Diglycerides: 26.4% by weight
Monoglycerides: 3.5% by weight
Lipids (free fatty acids, sphingolipids, glycolipids, galactolipids, phospholipids): 40.9% by weight
EPA: 36.8% by weight First, the oil paste was enzymatically freed from phospholipids.

Subsequently, a transesterification to ethyl ester is carried out. For this purpose, 100 g of the oil paste was added to a reactor with 300 g of ethanol. Sulfuric acid was added as a catalyst with continuous stirring. The resulting solution was heated to 80° C. and the reaction was allowed to proceed for 80 min.

The solution was then cooled and, after cooling, cyclohexane and water were added to separate the organic phase from the inorganic phase. The solution obtained is left to stand until the organic and inorganic phases separate. The inorganic phase settles at the bottom, so that the organic phase can be poured off.

The remaining inorganic phase can be treated again with cyclohexane, several times if necessary. The organic phases obtained are distilled and thereby the ethyl ester is obtained as an intermediate product. The oil which has been produced by the transesterification and forms the intermediate product has a concentration of 85% by weight ethyl ester. It has an EPA concentration of 38% by weight and is dark green in color.

Subsequently, the intermediate product is subjected to molecular distillation to remove impurities which, inter alia, result in the dark green color. In the present example, the molecular distillation was carried out at 0.01 mbar in order to keep the boiling temperature of the components of the intermediate product low. For the molecular distillation, the oil forming the intermediate product is mixed with a triglyceride oil at a mass ratio of 1:3 and the distillation is carried out at 150° C. After molecular distillation, the lipids remain in the oil comprising the ethyl ester, and the impurities, especially the pigments that previously colored the oil dark green, remain in the triglyceride, which is separated with the residual stream.

An oil is obtained as further intermediate product, which has a yellow to orange color. The oil comprises at least 90% by weight ethyl ester and has an EPA concentration of 38% by weight.

Subsequently, precipitation is carried out using urea to reduce the content of saturated fatty acids. For this purpose, the intermediate product is mixed with urea crystals and ethanol and the mixture is stirred continuously at 80° C. for 90 minutes. The solution obtained is then cooled and filtered. Brine is added to the remaining solution to wash out residual urea. As a further intermediate product there is now an oil present having an EPA concentration of 67% by weight.

For further purification, the intermediate product may be subjected to a further molecular distillation. In the present working example, the intermediate product was treated at a pressure of 0.03 mbar and at 160° C.

For the final bleaching, clay was added to the intermediate product as an antioxidant and any remaining impurities and peroxides were removed at 65° C. and at a pressure of 3 mbar. The clay was then separated off by filtration.

The final product obtained from the oil paste was an oil having an EPA concentration of 67% by weight, which is suitable for human consumption.

2$^{nd}$ Example

The method steps described above were carried out in a further experiment with another oil paste as starting material.

The contents specified below were determined for the oil paste:

Triglycerides: 29.1% by weight
Monoglycerides+diglycerides: 34.2% by weight
Lipids (free fatty acids, sphingolipids, glycolipids, galactolipids, phospholipids): 36.6% by weight
EPA: 24.9% by weight The final product obtained from the oil paste was an oil having an EPA concentration of 45% by weight. The oil is likewise suitable for human consumption.

The invention claimed is:

1. A method for producing edible oil, having a high content of unsaturated fatty acids, from a microalgae product, comprising the steps of: treating the microalgae product by transesterification to form an intermediate product; and adding triglyceride to the intermediate product for separating substances to remove impurities after the transesterification, in which triglyceride is used as a carrier for the impurities, the intermediate product being mixed with triglycerides in a mass ratio of 1:0.1 to 1:15.

2. The method according to claim 1, including using a microalgae oil and/or a lipid extract as the microalgae product and obtaining the microalgae product from phototrophic and/or mixotrophic microalgae, wherein the microalgae product has a content of at least 20% by weight EPA.

3. The method according to claim 1, wherein treating step includes treating the microalgae product by transesterification to form the intermediate product, wherein the microalgae product is converted to an ethyl ester.

4. The method according to claim 1, including separating an organic phase from an inorganic phase of the intermediate product by mechanical separation.

5. The method according to claim 4 including subjecting the organic phase of the intermediate product to a thermal material separation process for removing impurities.

6. The method according to claim 5, wherein in the thermal material separation process, the triglyceride is used as the carrier for the impurities.

7. The method according to claim 5, including carrying out the thermal material separation process for removing impurities by distillation.

8. The method according to claim 1, including separating saturated fatty acids from the intermediate product.

9. The method according to claim 8, including subjecting the intermediate product, after separation of the saturated fatty acids for purification to a thermal material separation process for removing remaining impurities.

10. The method according to claim 9, including converting the intermediate product, after the thermal material separation process, to a triglyceride by transesterification.

11. The method according to claim 1, including adding an antioxidant to the intermediate product.

12. The method according to claim 1, wherein the oil produced has an EPA content of more than 50% by weight.

13. The method according to claim 1, wherein the oil produced has a pigment content of <4000 mg/100 g.

14. The method according to claim 13, wherein the oil produced has a chlorophyll content of <3000 mg/100 g.

* * * * *